United States Patent
Batra

(10) Patent No.: US 6,707,642 B1
(45) Date of Patent: Mar. 16, 2004

(54) LONGITUDINAL MAGNETIC RECORDING HEAD WITH REDUCED SIDE FRINGING

(75) Inventor: Sharat Batra, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 306 days.

(21) Appl. No.: 09/777,033

(22) Filed: Feb. 5, 2001

Related U.S. Application Data

(60) Provisional application No. 60/180,295, filed on Feb. 4, 2000.

(51) Int. Cl.$^7$ .................................................. G11B 5/23
(52) U.S. Cl. ...................................................... 360/119
(58) Field of Search ................................. 360/119, 110, 360/121, 122, 125, 126; 29/603.1; 216/22, 100, 109

(56) References Cited

U.S. PATENT DOCUMENTS

| | | | |
|---|---|---|---|
| 2,822,427 A | | 2/1958 | Atkinson et al. |
| 3,582,918 A | | 6/1971 | Tiemann |
| 3,621,153 A | | 11/1971 | Wenner |
| 4,188,649 A | | 2/1980 | Cheatham et al. |
| 4,422,118 A | | 12/1983 | Helle et al. |
| 4,423,450 A | * | 12/1983 | Hamilton .................. 360/123 |
| 4,672,493 A | * | 6/1987 | Schewe .................... 360/125 |
| 4,935,832 A | * | 6/1990 | Das et al. ................. 360/121 |
| 5,016,342 A | | 5/1991 | Pisharody et al. |
| 5,075,956 A | * | 12/1991 | Das ........................ 360/122 |
| 5,311,386 A | * | 5/1994 | Mallary ................... 360/126 |
| 5,621,595 A | | 4/1997 | Cohen |
| 5,673,163 A | * | 9/1997 | Cohen ..................... 360/126 |
| 5,888,411 A | * | 3/1999 | Cohen ..................... 216/22 |
| 5,945,007 A | * | 8/1999 | Cohen ..................... 216/22 |
| 6,072,669 A | * | 6/2000 | Indeck .................... 360/121 |
| 6,391,212 B1 | * | 5/2002 | Cohen ..................... 216/22 |

FOREIGN PATENT DOCUMENTS

| | | |
|---|---|---|
| GB | 948648 | 4/1961 |
| GB | 1344890 | 1/1974 |
| JP | 57198523 | 12/1982 |
| JP | 58121124 | 7/1983 |
| JP | 63016407 | 1/1988 |
| WO | WO 01/26097 | 4/2001 |

OTHER PUBLICATIONS

Khizroev et al., U.S. Utility patent application Ser. No. 09/755,730, Entitled "Gapless Longitudinal Magnetic Recording Head with Flux Cavity", Filed Jan. 5, 2001.

Khizroev et al., U.S. Utility patent application Ser. No. 10/031,320, Entitled "Longitudinal Magnetic Recording Heads with Variable-Length Gaps", Filed Jan. 17, 2002.

* cited by examiner

*Primary Examiner*—Allen Cao
(74) *Attorney, Agent, or Firm*—Alan G. Towner, Esq.; Pietragallo, Bosick & Gordon

(57) ABSTRACT

A longitudinal recording head for use with magnetic recording media includes first and second writes poles in which the second pole has sides that wrap around a portion of the first pole in order to reduce or eliminate side fringing fields. The wrapped around sides of the second pole have relatively small cross sections away from the air bearing surface of the recording head, and relatively large cross sections at the air bearing surface. The sides may saturate in the narrow regions away from the air bearing surface, but do not saturate in the broad regions adjacent the air bearing surface. Longitudinal recording heads incorporating the wrapped around second pole sides effectively reduce or eliminate side fringing and are capable of improved recording densities.

12 Claims, 4 Drawing Sheets

LONGITUDINAL MAGNETIC RECORDING HEAD WITH REDUCED SIDE FRINGING

CROSS REFERENCE TO RELATED APPLICATION

This application claims the benefit of U.S. Provisional Patent Application Serial No. 60/180,295 filed Feb. 4, 2000.

FIELD OF THE INVENTION

This invention relates to longitudinal magnetic recording heads, and more particularly relates to longitudinal recording heads with reduced side fringing for recording at high densities.

BACKGROUND INFORMATION

Magnetic hard disk drives incorporating longitudinal recording heads are well known. However, conventional longitudinal recording heads suffer from the disadvantage that at high recording densities the track density must be increased (with a corresponding decrease in bit aspect ratio), which requires a very narrow head. In particular, a track width cannot be defined which is smaller than the head track width plus approximately two times the gap length of the head in conventional designs. This limitation results from side fringing magnetic fields which spread at a distance on the order of the gap length from the both track sides across the track. Decreasing the gap length should reduce this characteristic side fringing region. However, as the gap length is decreased, the magnetic fields in the region of recording media along the track are also reduced. For example, at a 50 nm gap length, the maximum in-plane field component at a 10 nm flying height is less than 10,000 Oe, assuming a high moment ($4\pi M_S \sim 20$ kG) pole tip material is used. This field is not sufficient to record transitions clear enough for such high densities. At such high densities recording media are expected to have dynamic coercivity above 5,000 Oe, and approximately two times the coercivity is required to record sufficiently defined transitions. Therefore, there is a trade-off in decreasing the gap length.

U.S. Pat. No. 5,621,595 to Cohen, which is incorporated herein by reference, discloses a magnetic recording head with a pinched gap which is said to reduce side fringing magnetic fields in the gap region. However, the design of the pinched gap results in saturation in the pinched region, which can result in significant side fringing fields during operation. Furthermore, the pinched gap design is extremely sensitive to write currents.

The present invention has been developed in view of the foregoing, and to address other deficiencies of the prior art.

SUMMARY OF THE INVENTION

The present invention provides a thin-film recording head which minimizes side fringing. Side fringing is reduced by wrapping one of the write poles around the gap at the air bearing surface (ABS) while controlling the geometry of the wrapped around sides. A portion of the wrapped around sides of the write pole away from the air bearing surface may saturate during writing, while the sides at the air bearing surface carry a magnetic field below the saturation level of the pole material. Side fringing is thereby reduced without saturating the wrapped around sides at the ABS.

An aspect of the present invention is to provide a longitudinal recording head for use with a magnetic recording medium. The recording head includes first and second write poles defining a gap therebetween. Sides of the second write pole are wrapped around a portion of the first write pole. Magnetic flux is propagated through the wrapped around sides of the second write pole such that a portion of the wrapped around sides of the second pole located at an air bearing surface of the recording head do not saturate when portions of the wrapped around sides located away from the air bearing surface saturate. Another aspect of the present invention is to provide a longitudinal recording head for use with a magnetic recording medium which includes a first write pole and a second write pole defining a gap between the first and second write poles. Sides of the second pole are wrapped around a portion of the first pole, and the wrapped around sides have a cross sectional area located at an air bearing surface of the recording head that is greater than a cross sectional area located away from the air bearing surface.

These and other aspects of the present invention will be more apparent from the following description.

DETAILED DESCRIPTION

Figure 1:
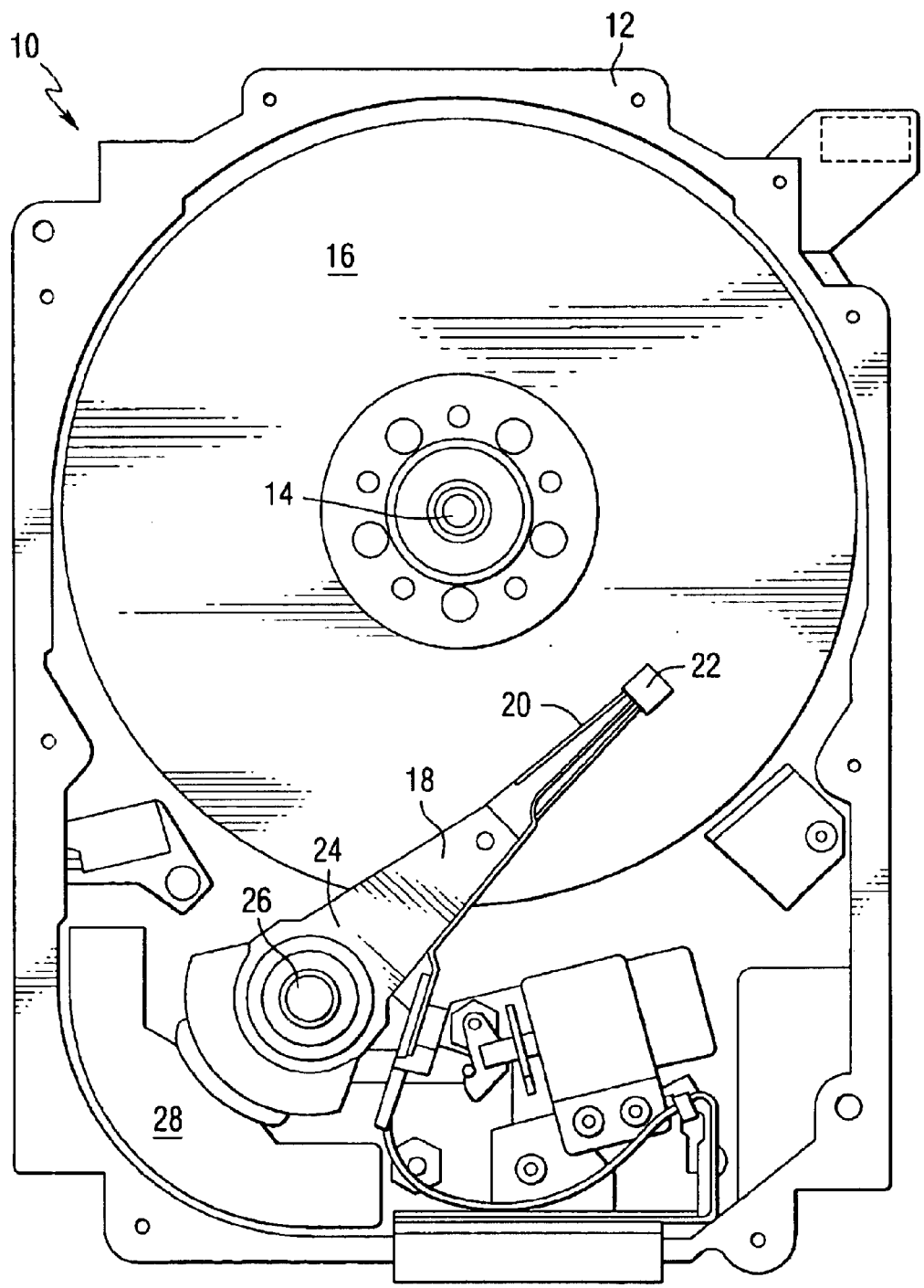
FIG. 1 is a top view of a typical computer hard disk drive for which the present invention may be used, illustrating the disk drive with its upper housing portion removed.

The invention is described in relation to presently known longitudinal recording heads used with a hard disk drive 10 for computers, one of which is illustrated in FIG. 1. As used herein, "recording head" means a head adapted for read and/or write operations. The hard disk drive 10 includes a housing 12 which contains the various components of the disk drive 10. The disk drive 10 includes a spindle motor 14 for rotating at least one magnetic storage medium 16 within the housing, in this case a magnetic disk. At least one arm 18 is contained within the housing 12, with each arm 18 having a first end 20 with a longitudinal recording head 22, and a second end 24 pivotally mounted on a bearing 26. An actuator motor 28, such as a movable coil DC motor, is located at the second end 24 of the arm, pivoting the arm 18 to position the head 22 over a desired sector of the disk 16. The actuator motor 28 is regulated by a controller which is not shown, and which is well known.

Writing is accomplished by rotating the disk 16 relative to the recording head 22 so that the recording head 22 is located above the appropriate sectors of tracks on the disk 16. Reading from the disk 16 may be accomplished either using the same head 22, or with a separate read head adjacent to the write head 22. If the individual magnetic fields are too close to each other within the magnetic layer of the disk 16, writing to the magnetic storage medium will affect not only the desired location on the disk, but also neighboring locations. Side fringing of the recording head 22 during writing operations can cause such deleterious effects in neighboring tracks. Therefore, maximizing flux density within a desired section of a track while minimizing flux density caused by side fringing within neighboring sections permits the tracks to be located closer together, thereby permitting a greater number of tracks within a disk, and allowing the disk to store additional information.

Figure 2:
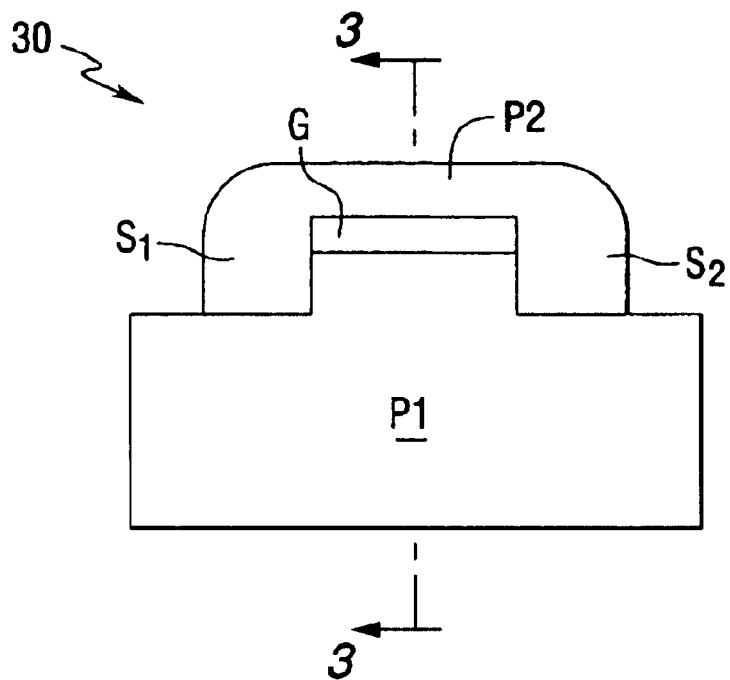
FIG. 2 is a partially schematic ABS view illustrating the write poles of a longitudinal magnetic recording head in which the second pole is wrapped around the sides of the first pole in accordance with an embodiment of the present invention.

FIG. 2 is a partially schematic view of the air bearing surface of the write poles of a longitudinal magnetic recording head 30 in accordance with an embodiment of the present invention. The recording head 30 includes a first write pole P1 and a second write pole P2. A gap G is defined between the first and second poles P1 and P2. The second pole P2 includes wrapped around sides $S_1$ and $S_2$ which wrap around a portion of the first pole P1. The poles P1 and P2 are typically made of magnetically soft permeable materials such as NiFe, NiFeCo or CoFeZr. In accordance with an embodiment of the present invention, the wrapped around sides $S_1$ and $S_2$ may be made of a lower saturation moment material than the rest of the second pole P2. The gap G may be made of air, $AlO_X$ (e.g., $Al_2O_3$), AlN or SiN.

Figure 3:
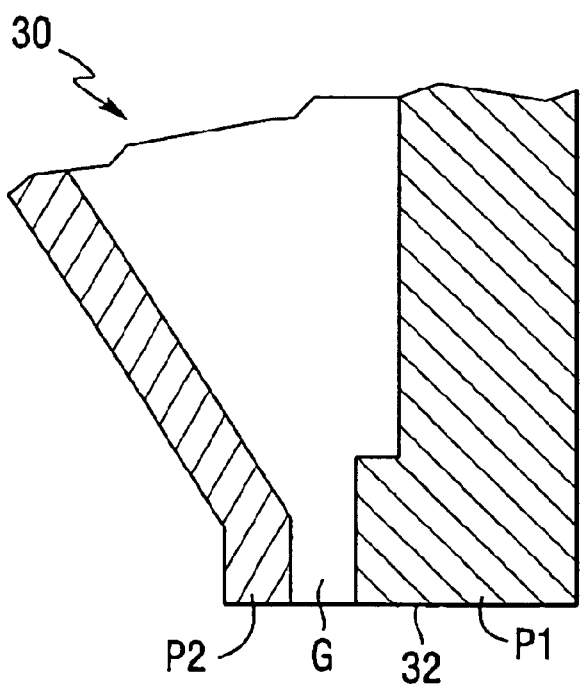
FIG. 3 is a partially schematic side view taken through section 3—3 of FIG. 2.

FIG. 3 is a side view taken along section 3—3 of the recording head 30 of FIG. 2. As shown in FIG. 3, the first write pole P1 is separated from the second write pole P2 by the gap G. The lower end of each write pole P1 and P2 terminates at an air bearing surface 32 of the recording head 30.

Figure 4:
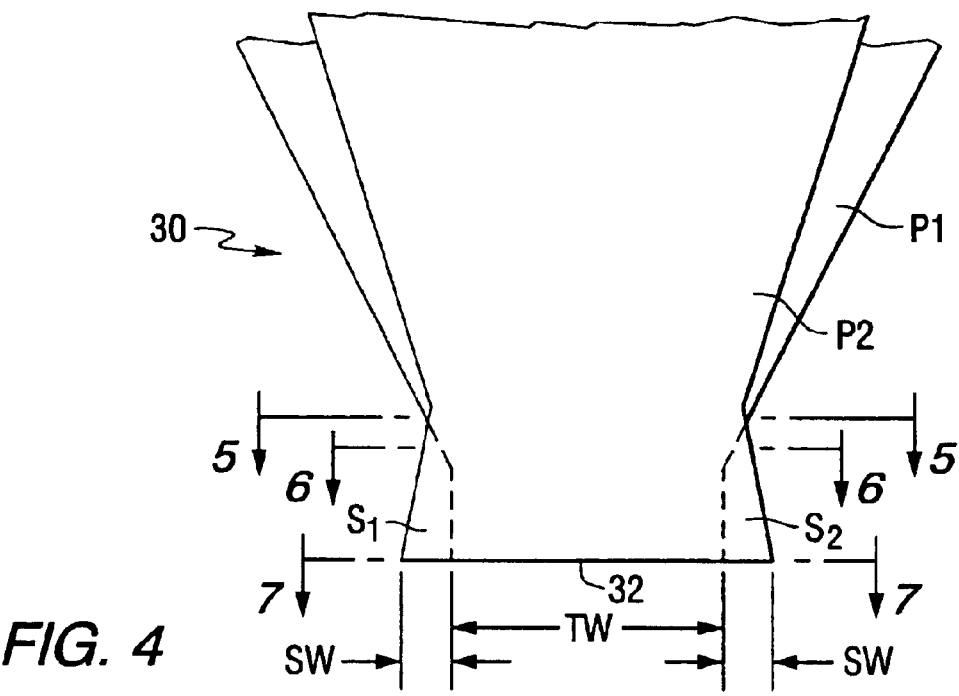
FIG. 4 is a partially schematic end view of a longitudinal magnetic write pole arrangement in which the second pole is wrapped around the first pole in accordance with an embodiment of the present invention. 15.

FIG. 4 is a partially schematic end view of the write poles P1 and P2 of the longitudinal recording head 30. As shown in FIG. 4, the second pole P2 overlaps the lower side portions of the first pole P1. The second pole P2 includes a narrow cross section near the throat region of the pole which increases or flares out near the lower air bearing surface 32 of the poles P1 and P2. At the air bearing surface 32, the gap between poles P1 and P2 defines a track width TW. The wrapped around sides $S_1$ and $S_2$ of the second pole P2 define side widths SW at the air bearing surface 32.

Figure 5:
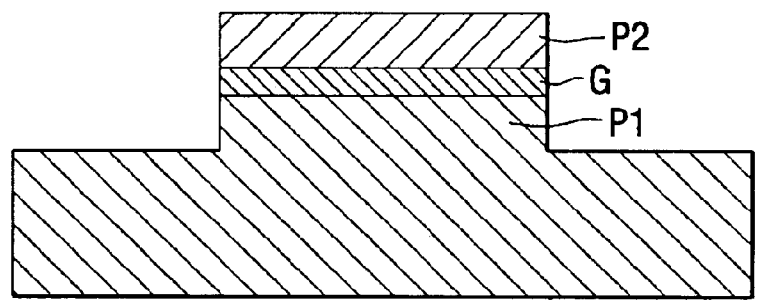
FIG. 5 is a view taken through section 5—5 of FIG. 4.
Figure 6:
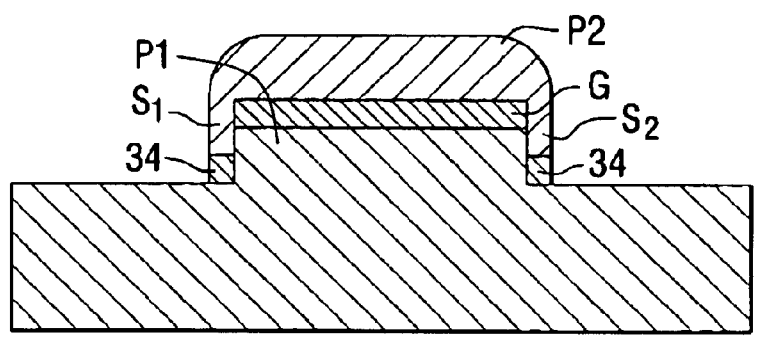
FIG. 6 is a view taken through section 6—6 of FIG. 4.
Figure 7:
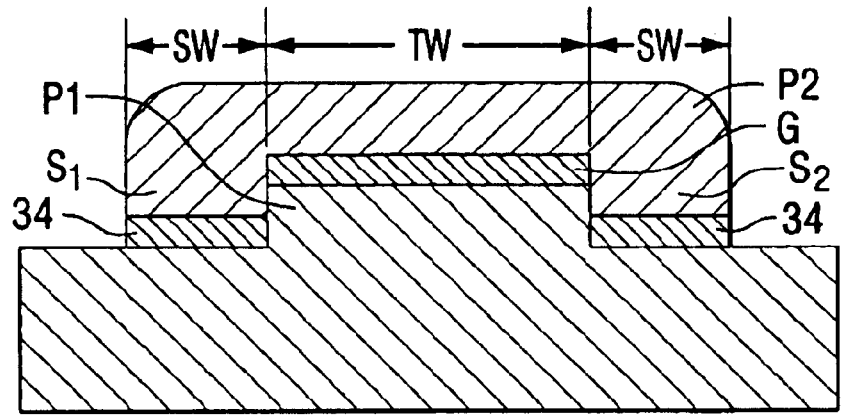
FIG. 7 is a view taken through section 7—7 of FIG. 4.

FIGS. 5, 6 and 7 are cross sectional views taken at different positions along the lengths of the poles P1 and P2. FIG. 5 is a view taken through section 5—5 of FIG. 4. As shown in FIG. 5, the cross sectional widths of the poles P1 and P2 near the throat region of the poles are approximately equal.

FIG. 6 is a view taken through section 6—6 of FIG. 4, which is closer to the air bearing surface 32 of the recording head 30 in comparison with section 5—5 shown in FIG. 5. As shown in FIG. 6, the second pole P2 includes relatively narrow wrapped around sides $S_1$ and $S_2$ at this intermediate region between the throat area of the poles and the air bearing surface 32. The wrapped around sides $S_1$ and $S_2$ may terminate before they contact the base of the first pole P1. For example, a layer of material 34 may be provided between the wrapped around sides $S_1$ and $S_2$ and the base of P1. The material 34 may be the same composition as the gap material G.

FIG. 7 is a view taken through section 7—7 of FIG. 4 near the air bearing surface 32 of the recording head 30. As shown in FIG. 7, the second pole P2 includes wrapped around sides $S_1$ and $S_2$ at the air bearing surface 32 which each have greater cross sectional areas than the wrapped around sides $S_1$ and $S_2$ away from the air bearing surface shown in FIG. 6. At the air bearing surface 32, the wrapped around sides $S_1$ and $S_2$ have relatively large widths SW. Although the side widths SW of both of the wrapped around sides $S_1$ and $S_2$ are typically equal as shown in FIG. 7, the side widths of each wrapped around sides $S_1$ and $S_2$ may be different. The dimension of each width SW may be controlled based upon the track width TW. The ratio of TW:SW may typically range from about 5:1 to about 1:1, for example, a ratio of from about 3:1 to about 2:1 may be suitable for many applications. Although the side width SW of each wrapped around side $S_1$ and $S_2$ shown in FIGS. 4–7 decreases linearly as the distance from the air bearing surface 32 increases such that straight angled sides are provided (as shown in FIG. 4), other wrapped around side shapes may be used, such as curved sides, stepped sides, etc.

Figure 8:
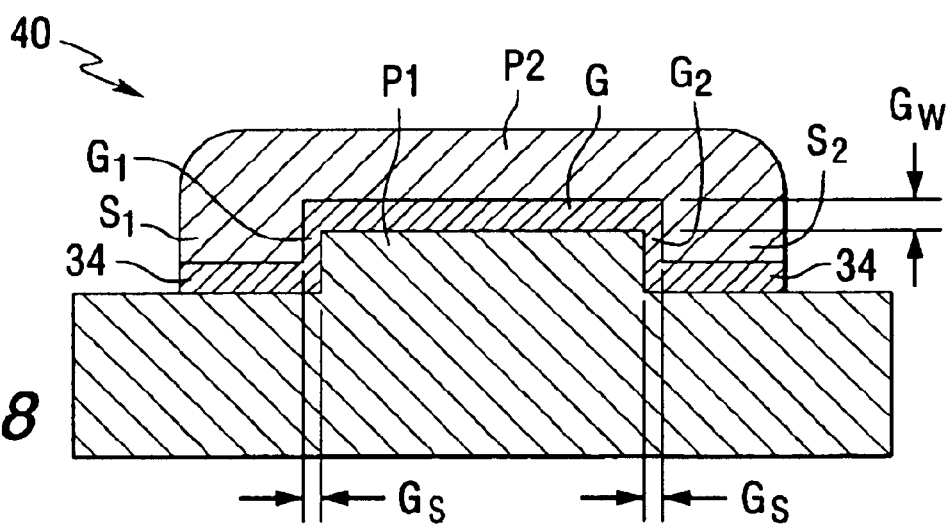
FIG. 8 is a partially schematic sectional ABS view similar to the embodiment shown in FIG. 7, with the addition of narrow wrapped around gap sides between the first pole and the wrapped around sides of the second pole.

FIG. 8 is a partially schematic view of the air bearing surface of the write poles of a longitudinal magnetic recording head 40 in accordance with another embodiment of the present invention. The recording head 40 shown in FIG. 8 is similar to the embodiment shown in FIGS. 4–7, with the addition of side gaps $G_1$ and $G_2$ extending from the gap G. The side gaps $G_1$ and $G_2$ wrap around a portion of the first pole P1 and provide side gaps between the first pole P1 and the wrapped around sides $S_1$ and $S_2$ of the second pole P2. The side gaps $G_1$ and $G_2$ have a width $G_S$ which may be relatively narrow in comparison with the width of the gap $G_W$. The dimension of the side gap $G_S$ may be from 0 to 100 percent of the gap width $G_W$. For example, the side gap dimension $G_S$ may be from about 5 to about 60 percent of the gap width $G_W$. A side gap dimension $G_S$ of approximately 20 percent of the gap width $G_W$ may be suitable for many applications. As shown in FIG. 8, the gap material G may extend across the base of P1 to provide the separator layer 34 between the ends of the wrapped around sides $S_1$ and $S_2$ and the base of P1.

In the embodiment shown in FIG. 8, the side gap dimension $G_S$ may be selected in order to provide satisfactory recording head efficiency while reducing unwanted side fringing. The recording head efficiency may be defined as the magnetic field at the recording gap $(H_g)$ per amp turns. The side gap dimension $G_S$ should be large enough to provide sufficient recording head efficiency, while being small enough to allow a magnetic field to be generated between the first pole P1 and the wrapped around sides $S_1$ and $S_2$ of the second pole P2 which is sufficient to reduce or eliminate unwanted side fringing. In addition, the wrapped around sides $S_1$ and $S_2$ may optionally be made of a lower saturation moment material than the rest of the second pole P2.

In accordance with the present invention, the wrapped around sides $S_1$ and $S_2$ of the second pole P2 have cross sectional areas that are greater at the air bearing surface of the recording head in comparison with their cross sectional areas away from the air bearing surface. This difference in cross sectional areas is illustrated, for example, by comparing FIGS. 6 and 7. As shown in FIG. 6, the wrapped around sides $S_1$ and $S_2$ away from the air bearing surface 32 have relatively small cross sectional areas.

As shown in FIG. 7, the wrapped around sides $S_1$ and $S_2$ have relatively large cross sectional areas at the air bearing surface 32. For example, the cross sectional area of each side $S_1$ and $S_2$ at the air bearing surface may be at least 1.2 or 1.5 times greater than the narrowest cross sectional area of each side $S_1$ and $S_2$ located away from the air bearing surface.

The configuration of the wrapped around sides $S_1$ and $S_2$, in accordance with the present invention, results in controlled magnetic saturation when magnetic flux is propagated through the second pole P2. Due to their smaller cross sectional areas away from the air bearing surface 32, the wrapped around sides $S_1$ and $S_2$ may saturate in a region near the throat of the pole P2 away from the air bearing surface, while avoiding saturation at the air bearing surface. Thus, during write operations, the narrow portions of the wrapped around sides $S_1$ and $S_2$ may approach a permeability of 1 while the permeability of the wrapped around sides $S_1$ and $S_2$ at the air bearing surface 32 may be about 5 or greater. The larger cross sectional areas of the wrapped around sides $S_1$ and $S_2$ at the air bearing surface and/or the use of a lower saturation moment material for the sides $S_1$ and $S_2$ prevent the wrapped around sides $S_1$ and $S_2$ from saturating at the air bearing surface. In this manner, the magnetic flux passing through the wrapped around sides $S_1$ and $S_2$ at the air bearing surface 32 is below the saturation moment of the wrapped around sides $S_1$ and $S_2$ at the air bearing surface. The avoidance of saturation at the air bearing surface of the wrapped around sides $S_1$ and $S_2$ reduces or eliminates side fringing fields from the gap G during writing operations.

The poles. P1 and P2 of the present invention may be made using standard fabrication techniques such as lithography, sputtering and plating. For example, P1 may be deposited, followed by the gap material and P2. Using a P2 mask that is wider than the P1 mask at the ABS, the second write pole P2 may be plated such that it overhangs or wraps around the gap and connects, or comes close to connecting, to the first write pole P1. The width of the P2 mask and the alignment tolerance may define the P2 overlap width. A standard post-slider lap may be used to define the length of the P2 overlap. The process may also be done by sputter deposition. In this case, the first write pole P1 and gap are sputtered, followed by patterning of P1. Next, conventional coil and insulation layers may be formed. Subsequently, the second write pole P2 is sputtered and patterned to define the overlap width.

Whereas particular embodiments of this invention have been described above for purposes of illustration, it will be evident to those skilled in the art that numerous variations of the details of the present invention may be made without departing from the invention as defined in the appended claims.

What is claimed is:

1. A longitudinal recording head for use with a magnetic recording medium, the longitudinal recording head comprising:

first and second write poles defining a gap therebetween, wherein sides of the second write pole are wrapped around a portion of the first write pole; and means for propagating magnetic flux through the wrapped around sides of the second write pole such that portions of the wrapped around sides of the second pole located at an air bearing surface of the recording head do not saturate when portions of the wrapped around sides located away from the air bearing surface saturate.

2. A longitudinal recording head for use with a magnetic recording medium, the longitudinal recording head comprising:

a first write pole; and a second write pole defining a gap between the first and second write poles, wherein sides of the second pole are wrapped around a portion of the first pole, and the wrapped around sides have a cross sectional area located at an air bearing surface of the recording head that is greater than a cross sectional area located away from the air bearing surface.

3. The recording head of claim 2, wherein the cross sectional area of each wrapped around side at the air bearing surface is at least about 1.2 times the smallest cross sectional area of the wrapped around side away from the air bearing surface.

4. The recording head of claim 2, wherein the cross sectional area of each wrapped around side at the air bearing surface is at least about 1.5 times the smallest cross sectional area of the wrapped around side away from the air bearing surface.

5. The recording head of claim 2, wherein the gap defines a track width at the air bearing surface of the recording head, each wrapped around side has a width measured parallel with the track width at the air bearing surface, and the ratio of the track width to each of the side widths is from about 5:1 to about 1:1.

6. The recording head of claim 5, wherein the ratio of the track width to each of the side widths is from about 3:1 to about 2:1.

7. The recording head of claim 5, wherein the side widths are equal.

8. The recording head of claim 2, wherein the gap comprises side gaps extending between the first pole and the wrapped around sides of the second pole.

9. The recording head of claim 8, wherein each side gap has a width at the air bearing surface of from greater than zero to about 100 percent of the gap width measured in a direction parallel with a track direction between the first and second poles at the air bearing surface.

10. The recording head of claim 9, wherein the width of each side gap is from about 5 to about 60 percent of the gap width.

11. The recording head of claim 9, wherein the width of each side gap is about 20 percent of the gap width.

12. The recording head of claim 9, wherein the side gap widths are equal.

* * * * *

UNITED STATES PATENT AND TRADEMARK OFFICE
CERTIFICATE OF CORRECTION

PATENT NO. : 6,707,642 B1
APPLICATION NO. : 09/777033
DATED : March 16, 2004
INVENTOR(S) : Sharat Batra Page 1 of 1

It is certified that error appears in the above-identified patent and that said Letters Patent is hereby corrected as shown below:

Column 2, Line 7
After "saturate.", "Another aspect…" (should start new paragraph)

Column 2, Line 35
After "invention.", delete --15--.

Column 2, Line 35
After "invention.", "FIG. 5 is…" (should start new paragraph).

Signed and Sealed this

Twenty-second Day of August, 2006

JON W. DUDAS
*Director of the United States Patent and Trademark Office*